May 3, 1938.  B. J. MARQUIS  2,115,821
HEAT AND POWER GENERATOR
Filed Nov. 9, 1936     2 Sheets-Sheet 1
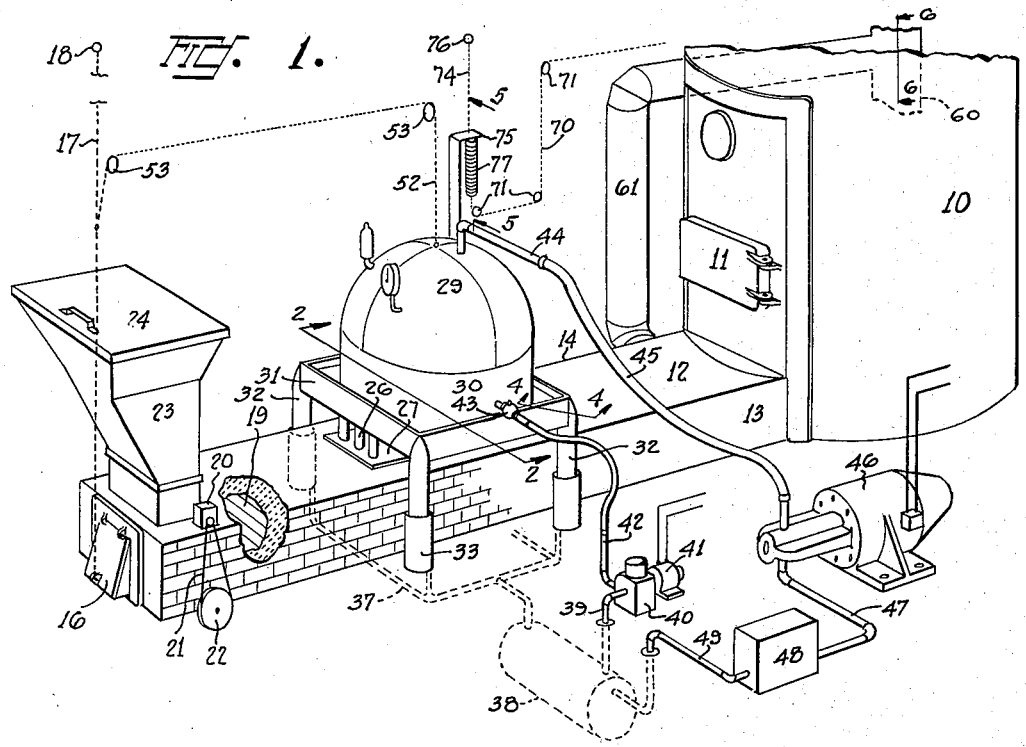
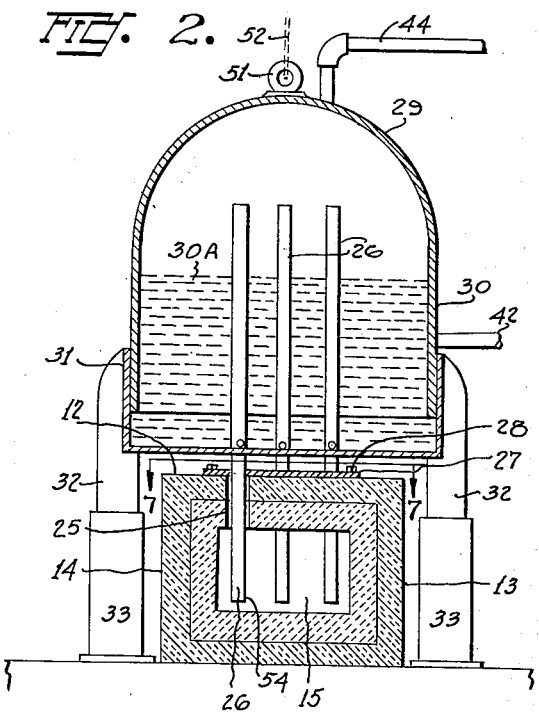
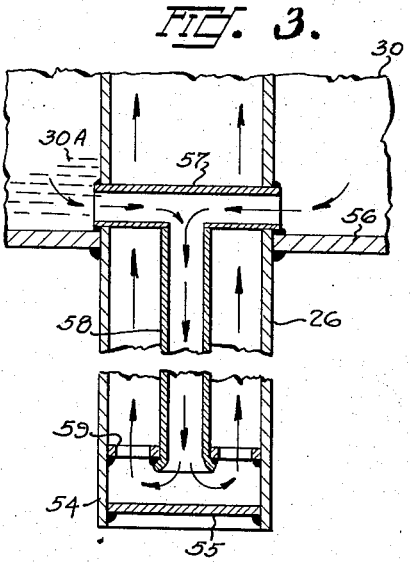
INVENTOR
B. J. MARQUIS
ATTORNEY

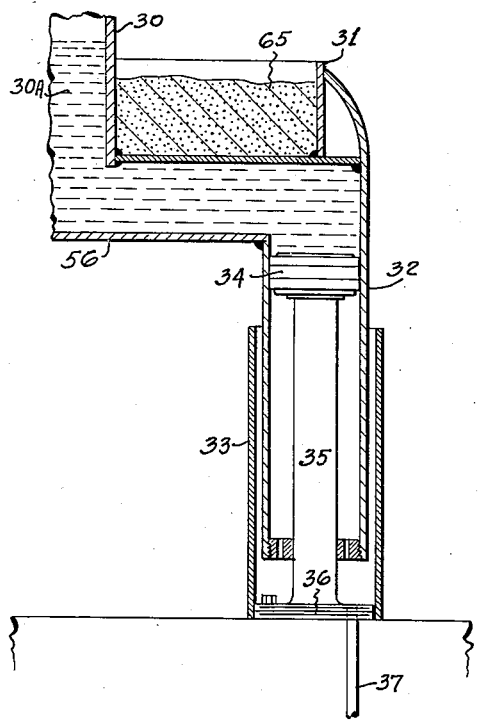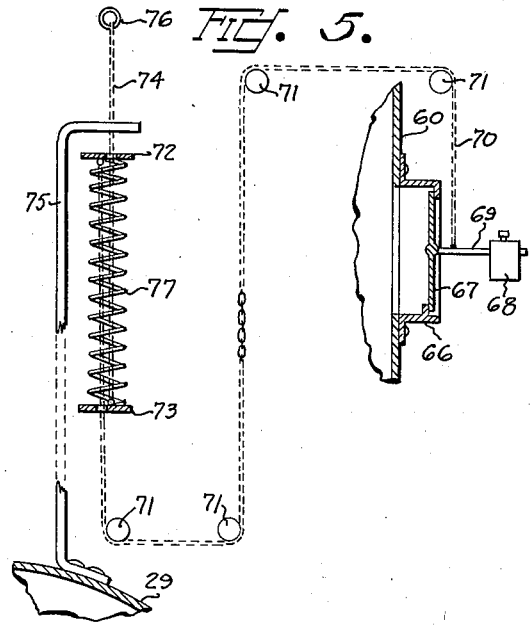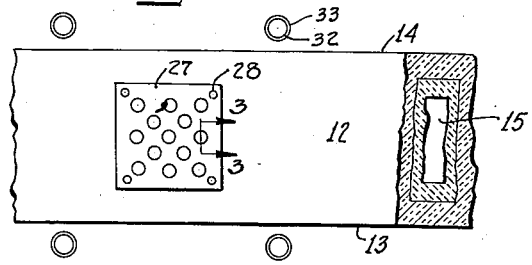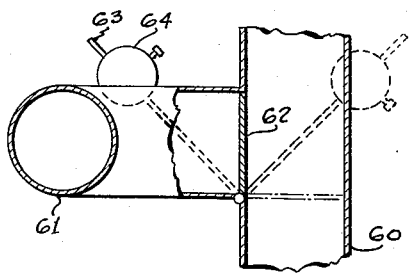

Patented May 3, 1938

2,115,821

UNITED STATES PATENT OFFICE 2,115,821

HEAT AND POWER GENERATOR

Burton J. Marquis, Portland, Oreg.

Application November 9, 1936, Serial No. 109,932

6 Claims. (Cl. 122—318)

This invention relates generally to devices for burning solid fuel, and particularly to a heat and power generator.

The main object of this invention is the provision of an apparatus for converting solid fuel into heat and the generation of electrical energy therefrom.

The second object is the production of a heat generator which can be attached to the ordinary furnace in a manner to completely consume the combustibles and to utilize the generated heat for the generation of electrical energy and at the same time provide a means for limiting the withdrawal of heat from the generator to meet the actual power requirements.

The third object is to make it possible for people living in isolated sections to have their own lighting plants by utilizing waste material such as sawdust, straw or other refuse.

The fourth object is the provision of the apparatus of the class described with special forms of controls for the automatic regulation thereof.

These and other objects are accomplished in the manner set forth in the following specification as illustrated in the accompanying drawings, in which:

Fig. 1 is a perspective view of the entire apparatus.

Fig. 2 is a vertical section taken along the line 2—2 in Fig. 1.

Fig. 3 is a fragmentary vertical section taken along the line 3—3 in Fig. 7.

Fig. 4 is a section taken along the line 4—4 in Fig. 1.

Fig. 5 is a fragmentary section taken along the line 5—5 in Fig. 1.

Fig. 6 is a fragmentary section through the damper mechanism taken on line 6—6 in Fig. 1.

Fig. 7 is a horizontal section taken along the line 7—7 in Fig. 2.

Similar numbers of reference refer to similar parts throughout the several views.

Referring in detail to the drawings, there is shown a furnace 10 provided with the usual fire door 11 to whose ash pit opening is connected the tunnel of a heat producing element, which tunnel consists of a top 12 and side walls 13 and 14, all of which are preferably of a suitable refractory material.

Through the tunnel extends the opening 15 whose outer end is covered by a hinged door 16 to which is attached a chain 17 which has secured on its end a ring 18 by means of which the chain 17 can be operated at a distant point, as for example, from an over head room.

Within the tunnel opening 15 is mounted a conveyor grate 19 which is mechanically operated by the motor 20 through the belt 21 and sheave 22. The details of the grate 19 and the driving mechanism therefor are fully set forth in my co-pending application Serial No. 100,591, filed September 14, 1936.

Above the tunnel top 12 is disposed a hopper 23 which is preferably provided with a cover 24. The hopper 23 communicates with the tunnel 15 through an opening (not shown) in the top 12. Formed in the top 12 are the openings 25 through which freely pass the vertical tubes 26. The tubes 26 also extend through the cover plate 27 which is secured to the top 12 by means of the bolts 28. The tubes 26 extend upwardly into the dome 29 of the boiler 30 whose lower end is secured within the rectangular base 31, the corners of which are provided with upright legs 32 whose feet extend downwardly into the tubes 33. Each leg 32 is tubular in form and contains a stationary piston 34 whose rod 35 is provided with a flange 36 at its lower end which forms a head for the lower end of the tube 33.

Connected to each tube 33 by means of a pipe 37 is a tank 38. The tank 38 is connected by means of a pipe 39 to a pump 40 which is operated by means of a motor 41. The discharge side of the pump 40 is connected by means of a pipe 42 to the boiler 30. The pipe 42 is preferably provided with a suitable check valve 43.

The dome 29 is connected by means of a pipe 44 and a steam hose 45 to the turbine driven generator 46 whose exhaust pipe 47 is connected to the condenser 48, which may be in the form of a water heater, radiator or air conditioner from which the condensation passes through the pipe 49 into the tank 38.

The dome 29 is provided with a ring 51 to which is connected the cable 52 which passes around the sheaves 53 and secured to the chain 17. Each of the vertical tubes 26 has its lower end 54 closed by means of a head 55. Extending transversely across each tube 26 above the boiler bottom 56 is the horizontal water tube 57 which connects by means of the vertical pipe 58 to the lower end of the tube 26 just above the head 55. The lower end of the pipe 58 is supported by means of the perforated plate 59.

It can be seen in Fig. 3 that water 30—A enters the tubes 26 through the horizontal tube 57 and then passes downwardly through the pipe 58 to the lower end 54 of the tube 26 which extends into the tunnel opening 15. The steam generated within the tubes 26 is discharged from the upper ends of the tubes 26 into the dome 29. As a pressure within the dome 29 rises, the entire boiler 30 is raised withdrawing the tubes 26 from the tunnel opening 15 and therefore subjecting a smaller portion thereof to the action of the heat being generated therein, thereby providing automatic regulation of the heat delivered to the boiler regardless of the amount of heat being generated within the tunnel opening 15.

The smoke from the furnace 10 is carried away by means of the smoke stack 60. A pipe 61 communicates between the smoke stack 60 and the tunnel opening 15 at a point near the furnace 10. There is provided a damper 62 which may be held to a closed or open position by means of the lever 63 on which is adjustably mounted a weight 64. Sand 65 is placed on the base 31 for pressure adjustment purposes.

On the stack 60 is provided a flange 66 in which is mounted a damper 67 which is normally held in a closed position by means of the weight 68. The weight 68 is adjustably mounted on the damper operating lever 69 to which lever is attached a chain 70 which passes around the sheaves 71 and is secured to the washer 72. The washer 72 is spaced from a similar washer 73 to which is attached a chain 74 which extends upwardly through the bracket 75 which is attached to the dome 29.

The chain 74 is attached to an adjusting ring 76 for manual control or it may be thermostatically controlled if desired. Between the washers 72 and 73 is placed a compression spring 77. The chain 70 passes freely through the washer 73 while the chain 74 passes freely through the washer 72.

The purpose of this form of the device is to prevent the operation of the check damper 67 whenever the pressure within the dome 29 is below a predetermined point. This is due to the fact that a low pressure in the dome 29 causes a low position for the bracket 75 and therefore any raising of the chain 74 causes the washer 72 to engage the bracket 75 and to be stopped thereby and the movement of the chain 74 merely causes the compression of the spring 77.

It can be seen from the foregoing that by the construction herein illustrated and described that I have provided a unique form of boiler whose heat absorbing surface is varied according to the requirements.

It will also be noted that in event no heat is required at the furnace 10, it is only necessary to shift the damper 62 to the position shown in dotted lines in Fig. 6 which will cause the unabsorbed heat to pass from the tunnel opening 15 through the pipe 61 into the stack 60 without passing through the furnace 10.

I claim:

1. In a device of the class described, the combination of a combustion chamber, a boiler having tubes slidably projecting into said chamber, a pressure actuated means for controlling the distance which said tubes project into said combustion chamber and draft control dampers operated by said pressure actuated means.

2. A device of the class described consisting of an elongated tunnel one end of which is connected to a furnace and the other end of which contains a traveling grate, a hopper for supplying fuel to said grate, a damper for controlling the flow of air to said grate, a boiler having tubes slidably projecting into said tunnel, hydraulic means for supporting said boiler, means for actuating said hydraulic means when the pressure within said boiler exceeds a predetermined minimum in a manner to reduce the exposed area of said tubes within said tunnel.

3. In a device of the class described, the combination of a combustion chamber, a boiler associated with said combustion chamber having tubes slidably projecting into said chamber and hydraulic jacks for supporting said boiler communicating with the water space of said boiler and actuated by the pressure within said boiler.

4. The device described in claim 4 characterized by having a water circulating pipe extending into said tubes above the bottom of the boiler and discharging at the lower end of said tubes, the lower end of said tubes being closed and the upper end opening into the upper portion of the boiler.

5. A device of the class described having in combination a vertically movable boiler, a furnace for heating said boiler, said furnace having a check damper at the smoke outlet thereof, said furnace also having an air inlet damper, yieldable means for opening said check damper and a brackeet on said boiler constituting a stop for said yieldable means whereby a lowered position of said boiler will prevent the operation of said check damper.

6. In a device of the class described, the combination of a tunnel constituting a combustion chamber, a boiler mounted over said tunnel having tubes projecting therefrom into said tunnel, hydraulic jacks constituting legs for supporting said boiler and for moving same vertically for the purpose of varying the area of said tubes exposed within said tunnel, said jacks communicating with the water space within the boiler, damper means for controlling the flow of air to said tunnel and means for actuating said damper for the vertical movement of said boiler.

BURTON J. MARQUIS.